United States Patent [19]

Juzenko

[11] 3,975,840

[45] Aug. 24, 1976

[54] MOLDED ATHLETIC BOOT AND METHOD OF MAKING SAME

[75] Inventor: Maurice J. Juzenko, LaSalle, Canada

[73] Assignee: Garcia Corporation, Teaneck, N.J.

[22] Filed: Jan. 24, 1975

[21] Appl. No.: 543,954

[52] U.S. Cl. .................................. 36/117; 12/142 E
[51] Int. Cl.² ........................ A43B 5/04; A43D 9/00
[58] Field of Search ............... 36/2.5 R, 2.5 AL, 45; 12/142 E, 142 EV

[56] References Cited
UNITED STATES PATENTS

| 3,362,091 | 1/1968 | Drago | 36/2.5 AL |
| 3,530,594 | 9/1970 | Vogel | 36/2.5 AL |
| 3,807,062 | 4/1974 | Spier | 36/2.5 AL |

Primary Examiner—Patrick D. Lawson
Attorney, Agent, or Firm—Fitzpatrick, Cella, Harper & Scinto

[57] ABSTRACT

A molded athletic boot, a reinforcing insert assembly for a molded athletic boot and a method of making the boot are described. A cloth-like insert is mounted on a last and a mold is then closed about the last. A castable material, such as polyurethane is injected into the mold so that it impregnates and encapsulates the insert prior to solidifying to form an athletic boot having great tensile strength and rigidity. The described insert assembly comprises a porous, elastic, sock-like element which fits over the last. A layer of a woven or knitted polyamide and a layer of a nonwoven polyamide are secured inside the sock-like element at selected locations.

25 Claims, 9 Drawing Figures

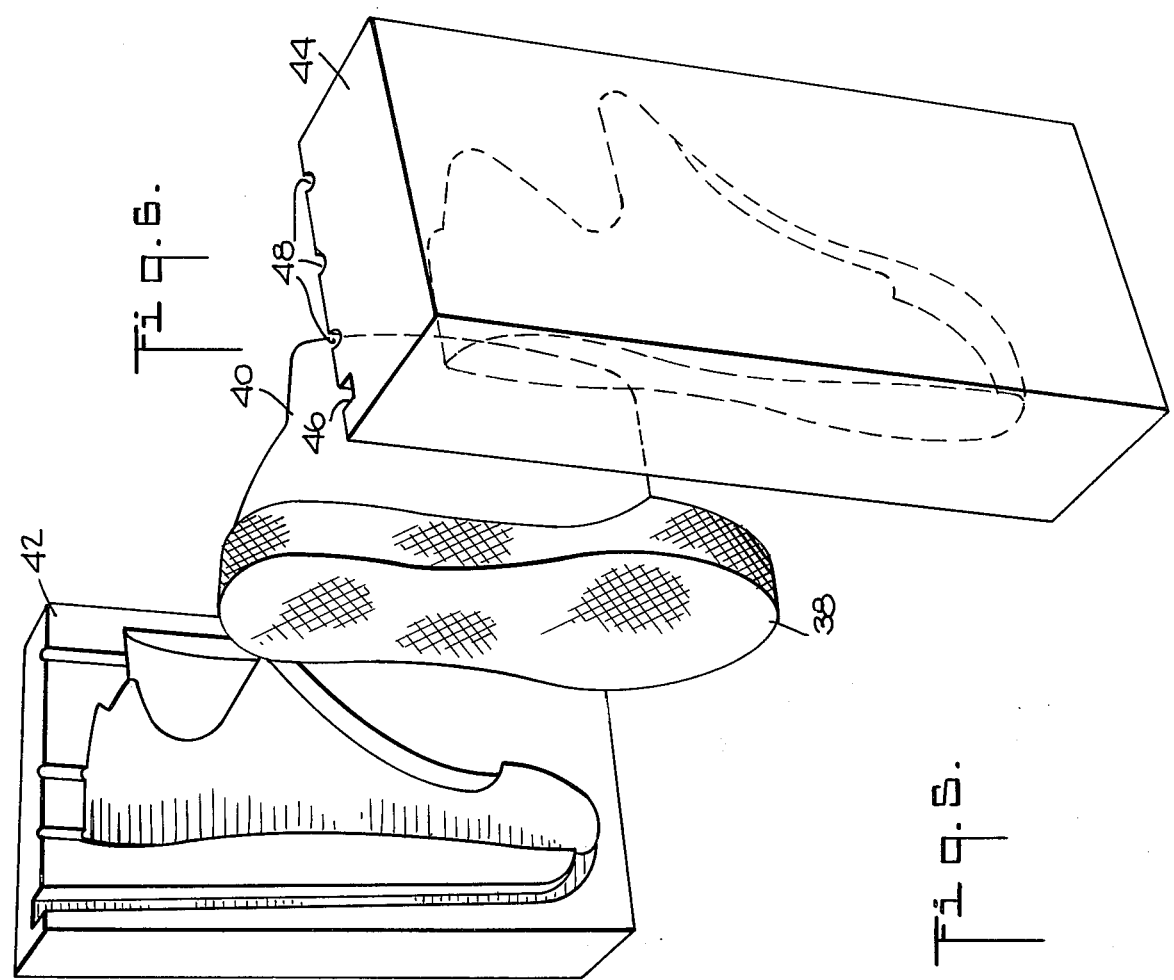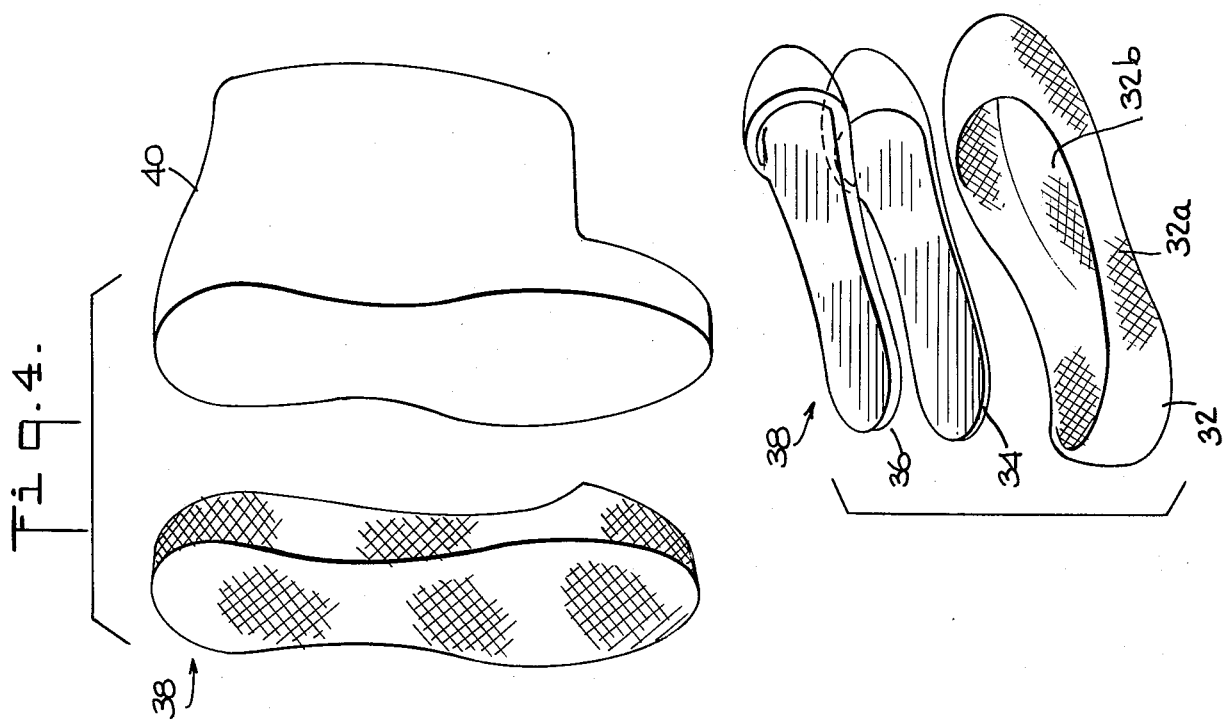

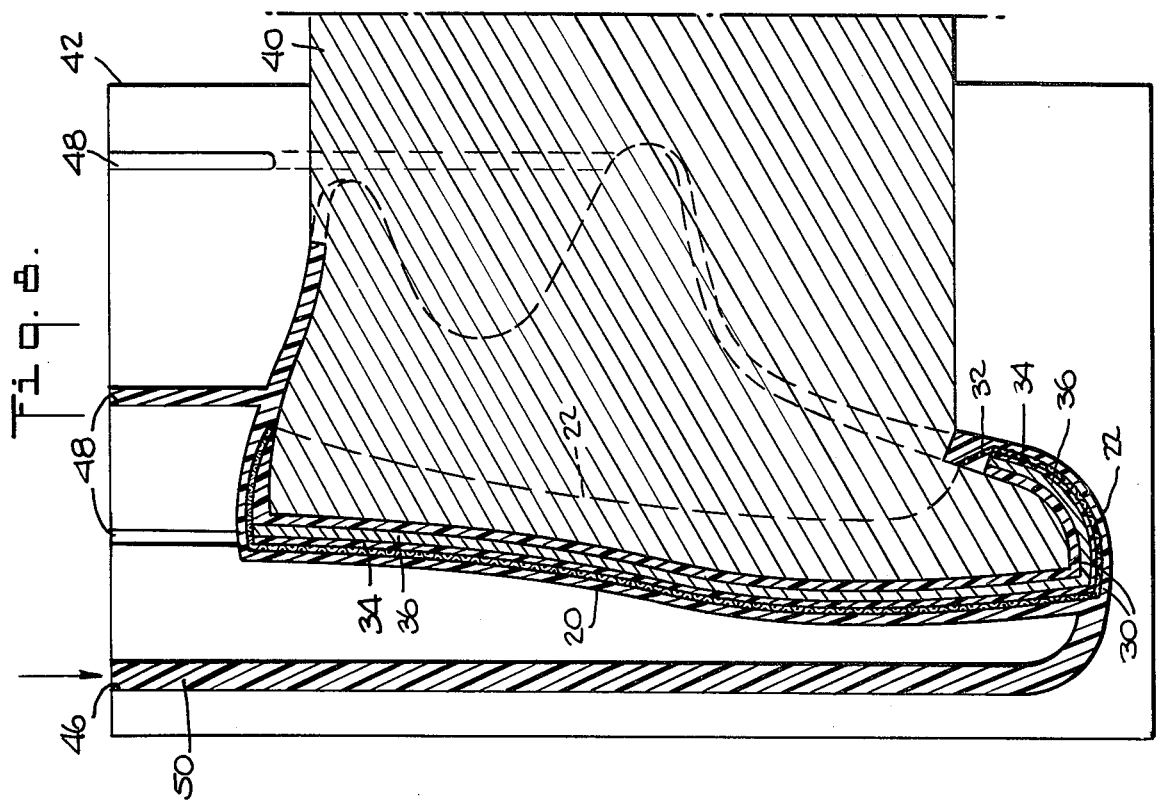
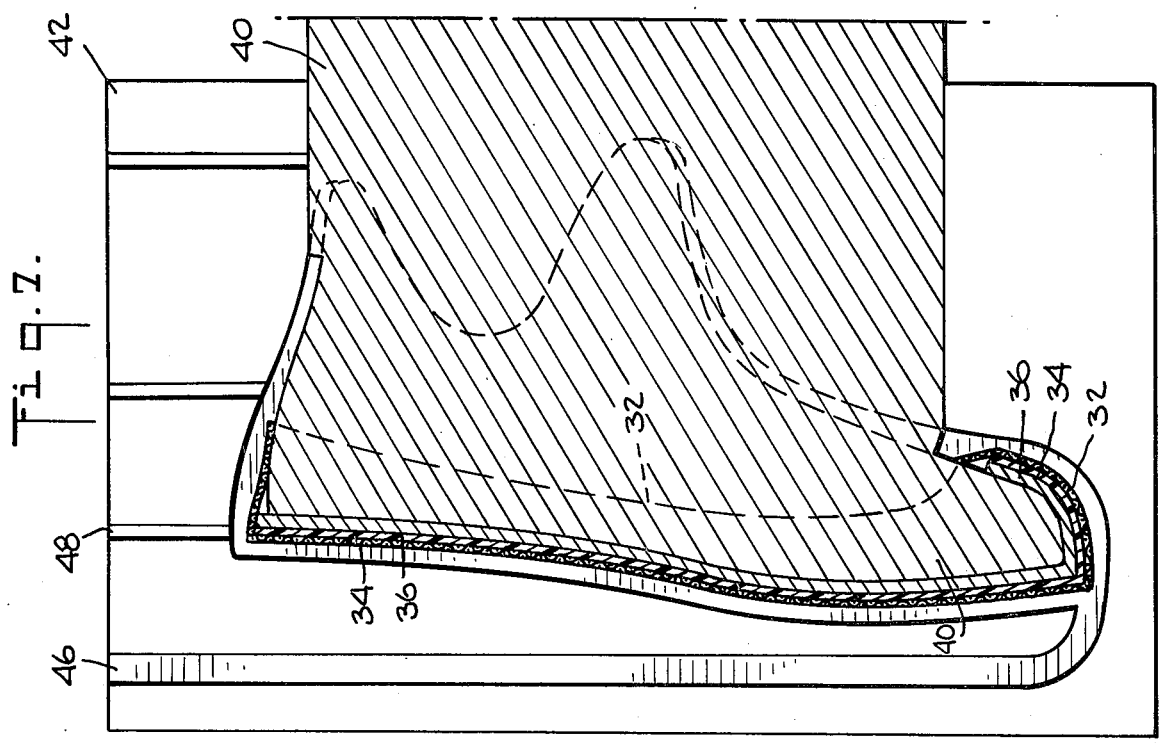

MOLDED ATHLETIC BOOT AND METHOD OF MAKING SAME

BACKGROUND OF THE INVENTION

1. Field of the Invention

This invention relates to athletic boots and more particularly it concerns a novel, molded athletic boot construction wherein an insert of cloth-like material is embedded or encapsulated in the material of the boot to provide strength and rigidity in selected regions without adding significantly to the weight or thickness of the boot material. The novel boot construction of the present invention is especially suited for ski boots and skate boots, such as boots for hockey skates.

2. Description of the Prior Art

Athletic boots have previously been molded of synthetic materials such as polyurethane rubber. These molded boots require additional support in certain regions of the boot to provide sufficient stiffness and rigidity. Accordingly, some prior art molded boots had regions that were built up in thickness to provide this needed extra support. Such construction made the boot excessively heavy and bulky. Other prior art molded boots used a separate insert element made from a rigid plastic, mechanically fastened within a molded outer shell. One arrangement for fastening the insert element to the outer shell is shown in U.S. Pat. No. 3,807,062. According to that patent apertures are formed at selected locations in the insert element and the outer shell is molded around the insert element so that the material of the outer shell flows into the apertures to lock the insert and shell together. This arrangement suffers from the disadvantage that the reinforcing insert applies maximum stiffness adjacent the foot of the wearer and therefore it is uncomfortable to wear. Also the mechanical interlocks between the boot and the insert are subject to very high stresses. Moreover, the strain produced in the boot shell is not evenly transmitted to the insert.

SUMMARY OF THE INVENTION

The present invention avoids the disadvantages of the prior art and provides easily manufactured molded athletic boots having great tensile strength and rigidity in precisely predetermined regions thereof without localized stress concentrations or the tendency to pull apart.

According to one aspect of the present invention, there is provided a novel athletic boot comprising a molded outer shell shaped to encase a human foot, with a porous insert of a cloth-like material embedded in and impregnated by the material of the outer shell and interlocked therewith. The material of the insert has a greater elastic modulus and higher strength than the outer shell; and it cooperates with the outer shell to provide increased rigidity and strength in the regions where the insert is located.

According to another aspect of the invention, there is provided a novel boot molding process in which a porous sock-like insert assembly is slipped over a last which in turn is encased within a mold. A castable material, such as polyurethane is then injected into the mold to fill the mold interior about the last and at the same time to impregnate and encapsulate the insert assembly. The insert assembly shifts slightly off the last and thus becomes embedded in and integrated into the material of the molded boot shell to provide strength and rigidity.

According to a further aspect of the present invention, there is provided a novel insert assembly for use in molded athletic boots. This insert assembly comprises a highly porous elastic sock-like holding and positioning member within which is contained one or more insert elements of porous material of high elastic modulus. These insert elements are secured to predetermined locations within the holding and positioning member by sewing, gluing, tack welding or the like. The holding and positioning member slips over the last and holds the insert elements in proper location during the mold filling operation; and yet it permits the insert elements to drift away, slightly, from the mold so that the insert elements become fully embedded in the boot material.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that this invention may be utilized as a basis for designing other structures or methods for carrying out the several purposes of this invention. It is therefore important that the claims be regarded as including such equilvalent constructions and methods as do not depart from the spirit and scope of the invention.

BRIEF DESCRIPTION OF THE DRAWINGS

Two embodiments of the invention have been chosen for purposes of illustration and description and are shown in the accompanying drawings forming a part of the specification, wherein:

FIG. 5 is an exploded perspective view showing the components of the insert assembly of FIG. 4;

FIG. 6 is an exploded perspective view showing the positioning of a last, with insert assembly attached, within a mold, as a further step in the molding of the boot shell of FIG. 1;

FIG. 7 is a side elevation section view of the mold of FIG. 6 closed about the last with insert assembly secured thereto;

FIG. 8 is a view similar to FIG. 7 but showing the mold filled with a castable boot forming material; and FIG. 9 is a fragmentary section view showing an alternate construction of the molded boot shell of FIG. 1.

DETAILED DESCRIPTION OF THE PREFERRED EMBODIMENTS

Figure 1:
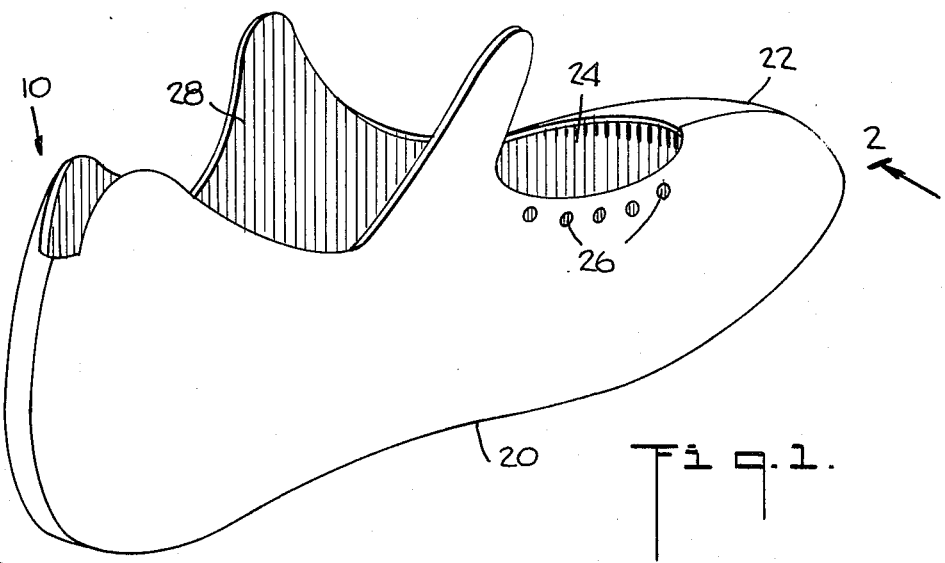
FIG. 1 is a perspective view of a molded boot shell in which the present invention is embodied.

As shown in FIG. 1 there is provided a hockey skate boot shell 10 of generally shoe shaped configuration. The shell 10 is formed with a generally flat sole 20 to which a skate blade (not shown) is later attached. The boot shell 10 is also formed with a hardened toe region 22 which provides protection against impact from sticks, skates and pucks during hockey play. An open instep region 24 is formed on the boot shell 10 and eyelets 26 are provided along each side for lacing the boot tightly to the foot. The boot shell 10 is also provided with a top opening 28 which surrounds the ankle of the wearer. In most cases a tendon and ankle guard (not shown) is attached to the sides of the boot shell just below the top opening 28 to extend up and protect the tendons and ankles of the wearer.

The boot shell 10 is cast or molded of a synthetic material such as polyurethane rubber. One suitable polyurethane rubber is available from E. I. du Pont de Nemours & Co. Inc., Wilmington, Del., under the trademark Adiprene. The urethane material has sufficient elasticity to conform closely to the foot of the wearer when the boot 10 is tightly laced. Also this material provides a high degree of scuff and wear resistance.

In skating, as in other sporting activities, the footwear used becomes subjected to especially high stresses at various portions of the footwear; and these stresses act in various directions, depending upon the particular sport involved. In hockey, for example, the skate boot must resist stresses which are caused on the one hand by forces imposed by the foot, and on the other hand by reactive forces imposed by the skate blade. These forces produce tensile stresses in the plane of the sole of the boot as well as torque stresses about axes perpendicular to this plane. In order to resist these stresses, and to avoid undue stretching as a result of them, the boot sole must have a high elastic modulus, i.e. a high rigidity in its own plane. Although rigidity can be increased to a certain extent by increasing the thickness of the sole, this results in a great expense and an undesirable increase in overall weight of the boot. As will be seen herein, the present invention makes it possible to increase the elastic modulus and rigidity along the plane of the boot sole to a substantial degree without appreciably increasing the weight or bulk of the boot.

The toe region of a hockey skate encounters a different type of stress, namely, that produced by impact from sticks, pucks and other skates. Consequently the toe region must be reinforced against bending stresses in localized regions. Again, the present invention, as explained below, provides localized reinforcement against bending and denting without undue increase in weight or thickness.

Figure 2:
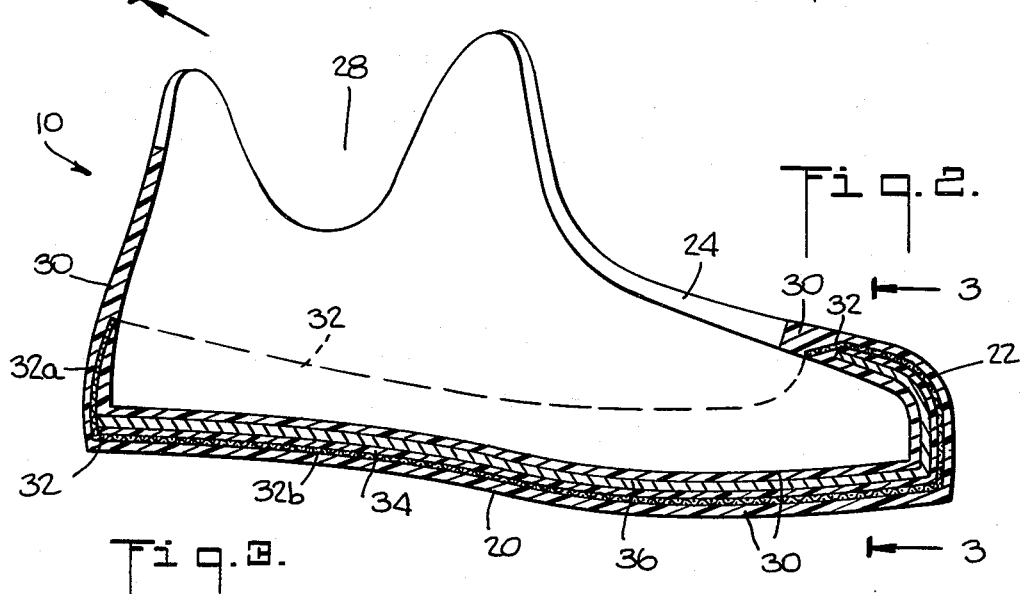
FIG. 2 is a section view, taken along line 2—2 of FIG. 1.
Figure 3:
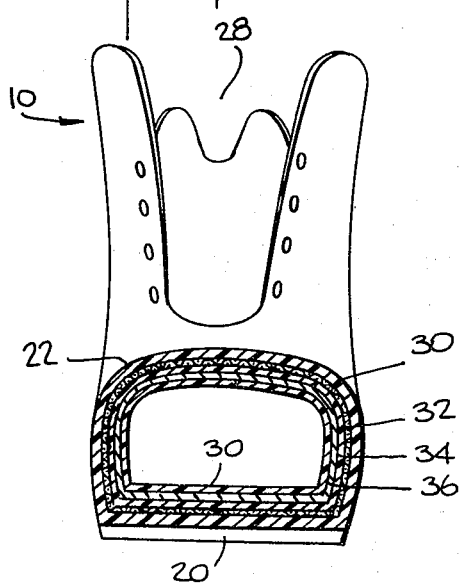
FIG. 3 is a further section view, taken along line 3—3 of FIG. 2.

Turning now to FIGS. 2 and 3 it will be seen that the skate boot shell 10 is composed primarily of an outer molded portion 30 within the material of which is embedded a multiple layer insert assembly made up of an outer sock-like holding and positioning layer 32 a woven layer 34 and a nonwoven layer 36. As indicated above, the outer portion 30 is preferably of a polyurethane rubber such as that available under the trademark Adiprene. The outer portion 30 may also be of a polyether, polyester or polycaprolactam type polyurethane. In order to achieve variations in tensile strength, rigidity and elastic elongation up to a certain degree in various regions, the thickness of the outer portion 30 is varied. However, in the sole region 20 and in the toe region 22 additional reinforcing is provided according to the present invention by means of the cooperative effect of the woven and nonwoven layers 34 and 36.

Both the woven and nonwoven layers 34 and 36 are of a polyamide fiber such as nylon, preferably the material sold under the trademark Kevlar, by E. I. du Pont de Nemours & Co. Inc., Wilmington, Del. Other materials which may be used include nylon-11, nylon-12 and nylon-13.

The woven layer 34 extends over and around the toe region 22 and along the length of the sole region 20. This woven layer is made up of fibers which extend along the plane of the toe and sole regions. Because of the porosity of the woven layer 34, the layer is impregnated with and is encapsulated within the material of the outer shell 30; and so it becomes an integral part of the outer shell. As a result, the elastic modulus of the material of the woven layer 34, which is substantially higher than the elastic modulus of the outer shell material 30, provides a high overall elastic modulus in the plane of the sole region 20 and in the plane of the toe region 22 which enables these regions to withstand high tensile stresses without appreciable stretching. It has been found, in fact, that the stretching of the polyurethane to its ultimate strength can be reduced from 200 percent to less than 5 percent by the use of the layers 34 and 36. This provides resistance to shearing forces and torque forces imposed by the skate blade during use.

The nonwoven layer 36 may be of the same material as the woven layer 34. However, the nonwoven layer is felted or matted with the fibers thereof being oriented randomly. It will also be noted that the nonwoven layer is much thicker than the woven layer 34. This thickness serves to provide resistance to bending or denting when it is impregnated with the material of the outer portion 30. Thus, a cooperative effect is produced between the outer shell material 30 which impregnates and maintains the spacing of the fibers of the nonwoven layer 30 and the material of the individual fibers themselves whose tensile strength in their spaced arrangement produces a resistance to bending. The degree of this bending resistance depends upon the thickness or bulk of the nonwoven layer. This bulk should be such that the nonwoven layer occupies 40–60 percent, preferably 45–55 percent of the overall volume of the boot region containing it.

As can be seen in FIG. 3, the layers 34 and 36 extend up over the top of the toe region 22 of the boot to provide strength and rigidity over this entire portion of the boot. However, the layers 34 and 36 extend back from the toe region only along the sole region 20 to strengthen it. The remainder of the boot contains no reinforcing material since the particular requirements for strength and rigidity in those other regions do not call for such reinforcement. Moreover, it is important that those other regions remain flexible to accommodate normal foot movements during skating. Of course, either or both the layers 34 and 36 may be extended or repositioned to different boot regions depending upon the particular requirements of the boot. Thus, ski boots would have reinforcing layers arranged at different locations than those shown herein for skate boots.

The outer sock-like holding and positioning layer 32 performs no appreciable reinforcing or strengthening function. Its purpose instead is to hold the other layers in place during the molding of the boot shell. This outer layer is of highly porous elastic material such as stretch nylon. It should not include any material which is incapable of withstanding the high temperature encountered during the molding of the material of the outer shell, nor should it include any material, such as latex which would weaken the outer shell.

It will be noted from FIG. 2 that the layer 32 includes a band-like side portion 32a which extends around the sides of toe and heel of the boot 10 and extends up about an inch 20 the sole region 20, although this may vary according to type and size of boots. The layer 32 also includes a bottom portion 32b which extends under the woven layer 34. The side portion 32a is preferably formed of a material comprising a polyurethane core wrapped with stretch nylon. One such material is sold under the trademark Lycra by E. I. du Pont de Nemours & Co. Inc., Wilmington, Del. The bottom portion 32b may be entirely of stretch nylon. In order to allow free flow of polyurethane material during a casting or molding operation, the layer 32 should have a porosity of about 95 percent.

Figure 4:
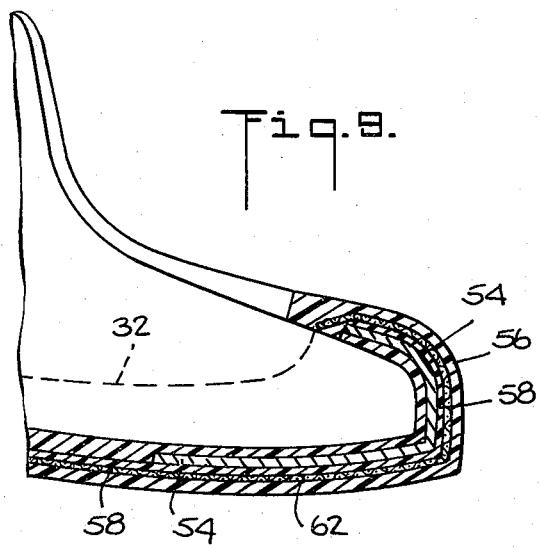
FIG. 4 is an exploded perspective view showing the positioning of an insert assembly on a last as a preliminary step in the molding of the boot shell of FIG. 1.

FIG. 4 shows an insert assembly 38 about to be positioned on a last 40 as a preliminary step to the molding of the skate boot shell 10 of FIG. 1. The last 40 is shaped in accordance with the human foot; and, of course, its size will depend upon the size of the boot shell to be formed. The insert assembly 38 appears in FIG. 4 as a fabric sock somewhat smaller than the bottom of the last 40. However, the outer holding and positioning layer 32 is of stretch material so that the assembly can be stretch fitted over the last 40 and it will remain in position thereon during subsequent steps.

As shown in the exploded view of FIG. 5, the insert assembly 38 comprises the outer holding and positioning member 32 with the woven and nonwoven layers 34 and 36 affixed therein. While the shape of the outer holding and positioning member 32 is such as to fit over the last 40, the shape of the woven and nonwoven layers 34 and 36 depends only upon the particular location in the boot shell where reinforcing is to be provided and upon the type of reinforcing required. It will be appreciated that since the reinforcing material does limit the flexibility of the outer shell material to a certain extent, it is not advantageous to provide the reinforcing throughout the entire shell. The inner layers 34 and 36 may be tack stitched, glued or otherwise held in position to the outer holding and positioning layer 32.

Turning now to FIG. 6 it will be seen that the last 40, after being fitted with the insert assembly 38, is positioned to be encased by outer mold parts 42 and 44 which come together about the last to define the extend configuration of the boot shell.

As can be seen in FIGS. 6 and 7, the mold parts 42 and 44 are formed with port of entry 46 and sprue and vent passages 48 in the vicinity of the heel of the boot so that moldable material may be poured under pressure into the interior regions of the mold surfaces to displace the air therein. In order to insure complete evacuation of air and penetration of moldable material, a bottom filling mold is desirable. It is also preferable, in some instances, to form the mold with additional secondary ports (not shown) to the mold cavity leading from a common port of entry 46 along the sole of the boot. It will further be noted in FIG. 7 that the insert assembly 38, although elastically held to the last 40 is somewhat loose so that the woven and nonwoven layers 34 and 36 may pull away slightly from the last to allow the moldable material to encapsulate these layers without, however, allowing them to shift laterally from their desired locations.

Turning now to FIG. 8 it will be seen that when moldable polyurethane or similar material 50 is injected into the mold, it impregnates the entire insert assembly 38 including each of the layers 32, 34 and 36. While the initial inflow of the material 50 may tend to push the insert assembly 38 against the last 40, it so happens that the continued flow of the material 50 through the mold eventually causes the insert assembly 38 to pull away slightly from the last 40. As a result only the outer holding and positioning layer 32 contacts the last 40; and this contact occurs only along the outermost edge of the layer 32. As a result the woven and nonwoven reinforcing layers become fully encapsulated and therefore integrated into the finally molded boot. After the injected material 50 solidifes, the mold parts are taken apart and the molded boot shell 10, with the insert assembly 38 encapsulated therein, is removed from the last 40.

It will be appreciated that the preformed insert assembly 38, with different woven and nonwoven layers positioned therein, makes it possible to provide various types and amounts of reinforcement at any desired location within a molded boot without complex manual operations.

One variation made possible by the present invention is illustrated in FIG. 9 wherein a boot 52 is formed with a nonwoven reinforcing layer 54 which extends only throughout its toe region 56 and a woven type reinforcing layer 58 extending throughout both its toe region 56 and its sole region 60. The nonwoven layer 54 and the woven layer 58 are both held in their proper locations by means of an elastic, porous outer holding and positioning layer 62 to which they are sewn or glued.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed and desired to be secured by Letters Patent is:

1. An athletic boot comprising a molded outer shell shaped to encase a human foot, and a porous, cloth-like insert impregnated and encapsulated by the material of said outer shell and interlocked therewith, said insert having a higher elastic modulus than said outer shell.

2. An athletic boot according to claim 1, wherein said porous insert comprises at least two layers of cloth-like material, each layer having a different filament arrangement and wherein both of said layers are impregnated by the material of said outer shell.

3. An athletic boot according to claim 1, wherein said outer shell is a polyurethane rubber.

4. An athletic boot according to claim 2, wherein one of said layers is woven.

5. An athletic boot according to claim 4, wherein the other of said layers is nonwoven.

6. An athletic boot according to claim 5, wherein said nonwoven layer has a thickness such that it occupies between 40 percent and 60 percent of the bulk volume of the outer shell in the region thereof containing the nonwoven layer.

7. An athletic boot according to claim 2, wherein one of said layers is a woven polyamide and wherein another layer is a nonwoven polyamide.

8. An athletic boot according to claim 5, wherein said woven layer extends along the sole of the outer shell.

9. An athletic boot according to claim 5, wherein said nonwoven layer overlies the toe of said outer shell.

10. An athletic boot according to claim 2, wherein said porous insert includes an outer elastic layer for holding the other layers in position with respect to a mold.

11. An athletic boot according to claim 10, wherein said outer layer is a polyurethane-nylon material.

12. An athletic boot according to claim 10, wherein said layers are held together by tack-stitching.

13. An insert assembly for use in the manufacture of an athletic boot, said insert assembly comprising an outer sock-shaped insert element of flexible, elastic and highly porous material capable of being fitted loosely but securely over a last, said insert assembly further comprising a reinforcing insert element of at least one layer of cloth-like material fastened to said outer insert element.

14. An insert assembly according to claim 13, wherein said reinforcing insert element is tack-stitched to said outer insert element.

15. An insert assembly according to claim 13, wherein said outer insert element is a polyurethane-nylon material.

16. An insert assembly according to claim 13, wherein said reinforcing insert element includes first and second cloth-like layers.

17. An insert assembly according to claim 16, wherein said first layer is a woven polyamide.

18. An insert assembly according to claim 17, wherein said second layer is a nonwoven polyamide.

19. A method of making an athletic boot, said method comprising the steps of mounting a cloth-like, porous insert assembly upon a foot shaped last, positioning a mold about the last and then injecting a castable rubber-like material into the mold to fill the space between the mold and the last and simultaneously to impregnate and surround the insert to form a strong unitary shell shaped to encase a human foot.

20. A method according to claim 19, wherein said insert assembly includes at least one layer of a cloth-like material having a higher elastic modulus than said castable rubber-like material.

21. A method according to claim 19, wherein said castable rubber-like material is polyurethane and said one layer is a polyamide material.

22. A method according to claim 20, wherein said insert assembly includes at least two layers of cloth-like material, one of which is woven and the other of which is nonwoven.

23. A method according to claim 19, wherein said insert assembly includes a highly stretchable portion to which is secured reinforcing layers of cloth-like material and wherein said highly stretchable portion is stretch fitted over said last.

24. A method according to claim 19, wherein said porous insert assembly comprises an outer highly porous stretchable sock-like member containing therein a porous insert of a higher elastic modulus than said castable rubber-like material and wherein said sock-like member is stretched over said last to hold said porous insert at a predetermined location during the injection of said castable rubber like material.

25. A method according to claim 24, wherein said sock-like member is sufficiently elastic to allow said porous insert to drift away slightly from said last during said injection to allow said porous insert to become encapsulated in said castable rubber-like material.

* * * * *